United States Patent [19]

Curry

[11] Patent Number: 4,935,891
[45] Date of Patent: Jun. 19, 1990

[54] PSEUDO-RANDOM PHASE SHIFTED ARITHMETIC BIT CLOCK GENERATORS FOR DIGITAL PRINTERS

[75] Inventor: Douglas N. Curry, Menlo Park, Calif.

[73] Assignee: Xerox Corporation, Stamford, Conn.

[21] Appl. No.: 288,526

[22] Filed: Dec. 22, 1988

[51] Int. Cl.$^5$ ............................................. G06F 1/02
[52] U.S. Cl. .................................... 364/721; 364/718
[58] Field of Search ............... 364/519, 721, 718, 703, 364/717; 328/14

[56] References Cited

U.S. PATENT DOCUMENTS

| | | | |
|---|---|---|---|
| 3,772,681 | 11/1973 | Skingle | 328/14 |
| 3,973,209 | 8/1976 | Nossen et al. | 328/14 |
| 4,134,072 | 1/1979 | Bolger | 328/14 |
| 4,328,554 | 5/1982 | Mantione | 364/721 |
| 4,559,613 | 12/1985 | Murphy et al. | 364/703 |
| 4,766,560 | 8/1988 | Curry et al. | 364/721 |

Primary Examiner—Gary V. Harkcom
Assistant Examiner—Tan V. Mai

[57] ABSTRACT

An arithmetic frequency synthesizer for generating a bit clock for the flying spot scanner of a digital printer includes means for loading a pseudo-random offset value, $accm_i$, into its accumulator at the start of each scan. The offset values for successive scans pseudo-randomly vary within a range $0 \leq accm_i < N$ for all bit clock frequencies required for normal operation of the printer. Thus, the offsets pseudo-randomly phase shift the phase transitions of the bit clock sufficiently to prevent periodic variations in the bit clock duty cycle from spatially aligning with each other in the process direction during the printing of adjacent scan lines.

4 Claims, 2 Drawing Sheets

PSEUDO-RANDOM PHASE SHIFTED ARITHMETIC BIT CLOCK GENERATORS FOR DIGITAL PRINTERS

FIELD OF THE INVENTION

This invention relates to variable frequency bit clock generators for digital printers and, more particularly, to methods and means for improving the perceived quality of images printed by printers which employ arithmetic frequency synthesizers for generating their bit clocks.

BACKGROUND OF THE INVENTION

Arithmetic frequency synthesizers, such as described in commonly assigned U.S. Pat. No. 4,766,560 of D. N. Curry et al., which issued December 23, 1985 on a "Parallel/Pipelined Arithmetic Variable Clock Frequency Synthesizer," are well suited for use as variable frequency bit clock generators for digital printing because they provide linear frequency control over a wide dynamic range. They characteristically include an accumulator for recursively accumulating an R-bit long binary input word having a time dependent value, N, at a preselected, stable reference frequency, $F_R$, so the most significant bit (MSB) of the accumuland (i.e., the word accumulated by the accumulator) oscillates at a frequency, $F_{BC}$ (herein referred to as the "bit clock frequency") that is given for any value of N within the range $-2^{R-1} \leq N < 2^{R-1}$ by:

$$F_{BC} = F_R(N/2^R) \tag{1}$$

U.S. Pat. No. 4,766,560 discloses a suitable implementation for such an arithmetic frequency synthesizer, so it is hereby incorporated by reference.

As is known, digital printing conventionally is carried out by providing a reflective, multi-faceted polygon which is rotated about its central axis to repeatedly scan one or more intensity modulated light beams across a photosensitive recording medium in a fast scan (i.e., line scan) direction while the recording medium is advancing in an orthogonal slow scan (i.e., process) direction, such that the beam or beams scan the recording medium in accordance with a raster scanning pattern. Each of the light beams is intensity modulated in accordance with a serial data sample stream at a rate determined by a bit clock frequency, whereby the individual picture element ("pixels") of the image represented by the data samples are printed on the recording medium in positions more or less precisely determined by the bit clock.

Digital printers ordinarily have start of scan detectors for resynchronizing their bit clocks at the beginning of each scan, thereby reducing pixel positioning errors caused by bit clock phase jitter. Thus, when an arithmetic frequency synthesizer is employed as a bit clock generator for such a printer, its accumulator typically is synchronously initialized from a zero or "cleared" state in response to a start of scan pulse at the start of each scan, thereby limiting the phase jitter of the bit clock, $F_{BC}$, it generates to ± one half the period of the reference clock frequency, $F_R$.

U.S. Pat. No. 4,766,560 teaches that the value N of the input word for the accumulator of such frequency synthesizer can be varied as a function of time for adjusting the bit clock frequency, $F_{BC}$, as required to compensate for (1) variations in the angular velocity at which the polygon is rotated ("motor hunt errors"), (2) variations in the angular velocity at which different facets of the polygon sweep the incident light beam or beams across the recording medium ("polygon signature errors"), and/or (3) variations in the linear velocity at which the light beam or beams sweep across different segments of the scan lines ("scan non-lenearity errors"). Polygon signature errors and scan non-linearity errors essentially are time invariant for a given printer, while the motor hunt errors normally vary at low frequency.

The phase transitions of the bit clock generated by an arithmetic frequency synthesizer span an integer number of reference clock cycles. Unfortunately, however, unless the value N of the input word for the accumulator happens to be an integer power of two (i.e., $N = 2^K$, where K is an integer), the spacing of the bit clock phase transitions more or less periodically vary by ± one half the period of the reference clock frequency. Therefore, whenever the accumulator input word value, N, is not an integer power of two (i.e., $N \neq 2^K$), the duty cycle of the bit clock tends to vary periodically at a moderately high frequency. Improved techniques for performing scan non-linearity compensation and motor hunt compensation with arithmetic frequency synthesizer are described in concurrently field and commonly assigned U.S. patent applications of D. N. Curry entitled "Piecewise Spatial Linearization of Arithmetically Synthesized Bit Clocks for Flying Spot Scanners" filed Dec. 23, 1988 under Ser. No. 07/289,847 and "Arithmetically Computed Motor Hunt Compensation for Flying Spot Scanners" filed Dec. 22, 1988 under Ser. No. 07/288,501, now U.S. Pat. No. 4,893,136, respectively.

Periodic duty cycle variations of the bit clock, $F_{BC}$, for a digital printer are troublesome because an ordinary observer is able to detect very small, spatially periodic imperfections in printed images. For example, when lines are printed parallel to the process direction at a high spatial frequency, an observer is likely to detect almost any minor variations in the duty cycle of those lines if the duty cycle variations are essentially aligned in the process direction from scan line-to-scan line. That, unfortunately, is precisely the alignment that tends to be caused by periodic variations in the duty cycle of a bit clock generated by an arithmetic frequency synthesizer.

SUMMARY OF THE INVENTION

For that reason, in accordance with the present invention, an arithmetic frequency synthesizer for generating a bit clock for the flying spot scanner of a digital printer includes means for loading a pseudo-random offset value, $accm_i$, into its accumulator at the start of each scan. The offset values for successive scans pseudo-randomly vary within a range $0 \leq accm_i < N$ for all bit clock frequencies required for normal operation of the printer. Thus, the offsets pseudo-randomly phase shift the phase transitions of the bit clock sufficiently to prevent periodic variations in the bit clock duty cycle from spatially aligning with each other in the process direction during the printing of adjacent scan lines.

In a printer having a polygon scanner, a different predetermined pseudo-random offset value advantageously is provided for each facet of the polygon, whereby the offset value for any given facet can be retrieved from a table look-up memory under the control of a scan counter or the like to be applied to the frequency synthesizer alone or as an initial offset for a polygon signature correction value for that particular facet.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with specific reference to an illustrated embodiment, it is to be understood that there is no intent to limit it to that embodiment. On the contrary, the goal is to cover all modifications, alternatives and equivalents falling within the spirit and scope of the invention as defined by the appended claims.

Figure 1:
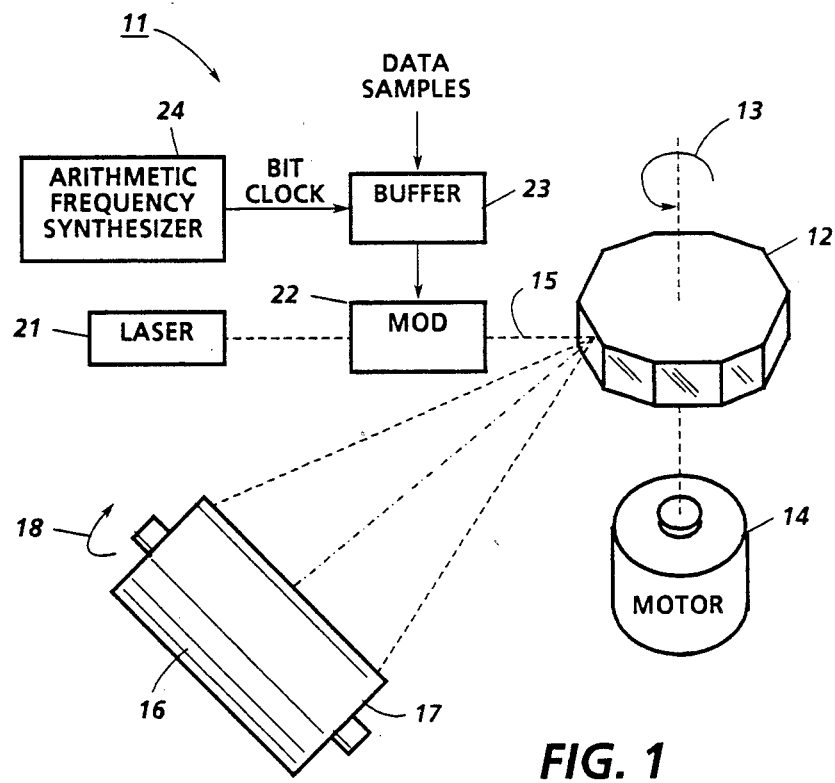
FIG. 1 is a simplified schematic diagram of a laser printer.

Turning now to the drawings, and at this point especially to FIG. 1, there is a more or less conventional digital printer 11 having a reflective, multi-faceted polygon 12 which is rotated about its central axis, as indicated by the arrow 13, by a motor 14 to cyclically sweep an incident, intensity modulated light beam 15 in a fast scan or "line scanning" direction across a photosensitive recording medium 16. The recording medium 16, in turn, is advanced simultaneously in an orthogonal slow scan or "process" direction, so the light beam 15 exposes it in accordance with a raster scanning pattern. As illustrated, the recording medium 16 is coated on a drum 17 which is rotated about its longitudinal axis, as indicated by the arrow 18, but it will be evident that this is only one of its many possible configurations.

As a general rule, the light beam 15 is supplied by a laser 21 and is intensity modulator in accordance with data samples which are serially applied to a modulator 22 at a rate which is determined by the frequency of a bit clock that is applied to a scan buffer 23 or the like by a variable frequency bit clock generator 24. The data samples represent individual dots of a half tone image or pixels of a simple image (collectively referred to herein as "pixels"), so the rate at which they are applied to the modulator 22 is controlled by the bit clock generator 24 to control the positioning of the pixels on the recording medium 16.

Figure 2:
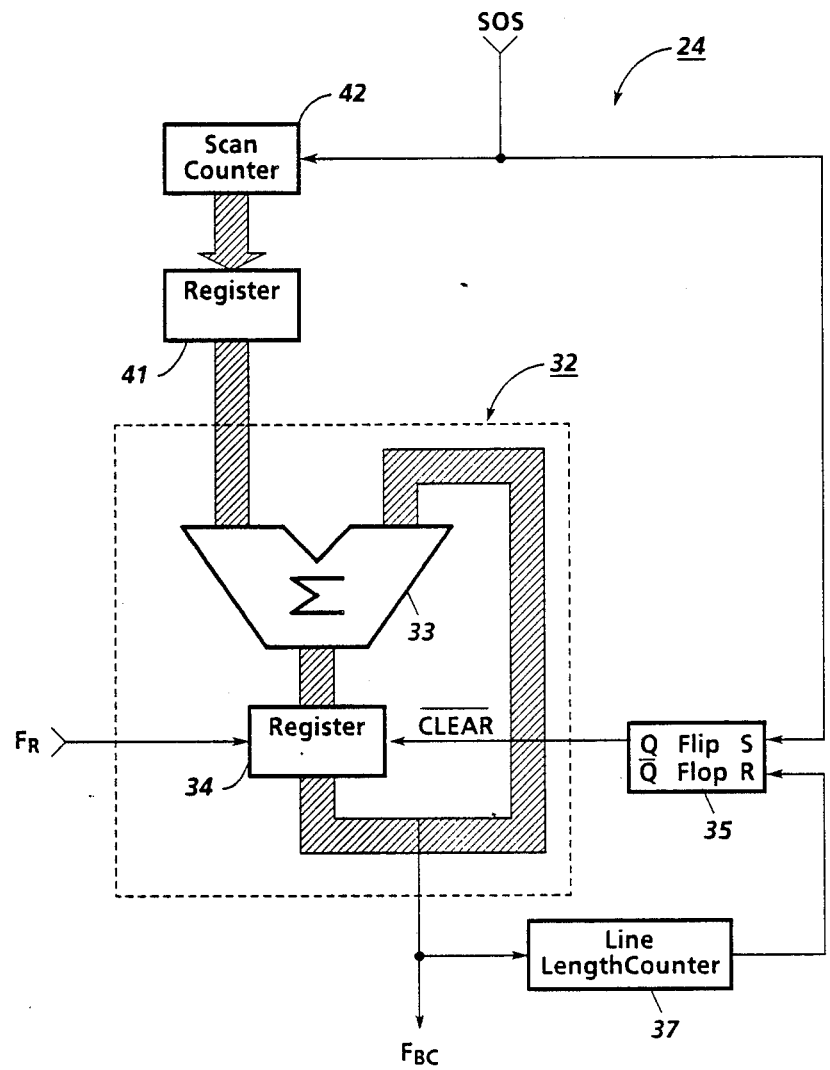
FIG. 2 is a block diagram of an arithmetic frequency synthesizer which incorporates this invention to generate a pseudo-randomly phase shifted bit clock for the printer shown in FIG. 1.

Referring to FIG. 2, it will be seen that the bit clock generator 24 is an arithmetic frequency synthesizer having a R-bit wide accumulator 32 for recursively accumulating a R-bit wide input word of time varying value N. To perform the accumulation, in keeping with the teachings of U.S. Pat. No. 4,766,560, the accumulator 32 comprises a dual input port, R-bit wide adder 33 having its output port returned to one of its input ports by a R-bit wide register 34 which is clocked at a predetermined reference frequency, $F_R$. The input word is applied to the other input port of the adder 33, so the most significant bit (MSB) of the accumuland of the accumulator 32 oscillates at the bit clock frequency, $F_{BC}$, given by equation (1) above.

The accumulator 32 is idle from the conclusion of each scan to the beginning of the next one because its register 34 is cleared during such "flyback" periods. For example, the register 34 suitably is cleared during the flyback time of the scanner by a low ("0") logic level signal, $\overline{CLEAR}$, that is asserted and deasserted by a flip-flop 35 in response to an end of scan pulse, which supplied by a line length counter 37, and a start of scan (SoS) pulse, which is supplied by a start of scan detector (not shown), respectively. Each scan line of the printer image conventionally is composed of a predetermined number of pixels (or dots in the case of a half tone image), so the counter 37 is selected to rollover and supply an end of scan pulse each time it accumulates an equivalent number of bit clock pulses. The start of scan detector, on the other hand, characteristically is positioned a short, fixed distance from the lead edge of the scan field to supply a start of scan pulse for reinitializing the frequency synthesizer 24 at the start of each scan cycle.

As previously pointed out, the arithmetic frequency synthesizer 24 generates a bit clock, $F_{BC}$, at a frequency determined by the value N of the input word for its accumulator 32 during the printing of each of the scan lines of an image. In practice, the value N of this word may be varied as a function of time to adjust the bit clock frequency, $F_{BC}$, as required to compensate for motor hunt errors, polygon signature errors, and/or scan non-linearity errors. However, it will be recalled that scan non-linearity errors are time invarient from scan-to-scan for all facets of the polygon 12 (FIG. 1), while polygon signature errors are time invarient for all scans by any given facet of the polygon 12. Consequently, even if the bit clock frequency, $F_{BC}$, is varied to compensate for either or both of those errors, there still is the risk that periodic duty cycle variations of bit clock, $F_{BC}$, will result in readily observable printing irregularities or "defects." Indeed, there is an appreciable risk of that printing defects will occur even if the frequency of the bit clock, $F_{BC}$, is varied to compensate for motor hunt errors because motor hunt errors typically have a relatively low frequency.

Therefore, in accordance with the present invention, provision is made for preloading a pseudo-random offset value, $accm_i$, into the accumulator 32 at the beginning of each scan cycle. These offsets pseudo-randomly vary from scan-to-scan within a range of $0 \leq accm_i < N$ for all bit clock frequencies, $F_{BC}$, that are required for normal operation of the printer 11 (FIG. 1). Accordingly, they pseudo-randomly phase shift the bit clock phase transitions for neighboring scan lines, while only slightly reducing the pixel positioning precision of the printer 11. Specifically, the bit clock phase shift caused by the pseudo-random offsets is limited to ± one-half reference clock period, so they reduce the phase precision of the bit clock, $F_{BC}$, from a best case tolerance of ± one-half reference clock period to a slightly looser tolerance of ± one reference clock period.

In keeping with one of the more detailed features of this invention, a predetermined pseudo-random offset value advantageously is provided for each facet of the polygon 12 (FIG. 1), whereby the accumulator 32 is initialized with the same offset value for all scans by any given facet. In that event, the offsets for the respective facets of the polygon 12 may be employed as floating references for computing the signature correction values which are needed to compensate for the signature errors of the individual facets. The advantage of doing that is that signature compensation then can be provided without further reducing the pixel positioning precision of the printer 11 (FIG. 1). For example, the offset values for the respective facets of the polygon 12 may be stored in a table look-up memory 41 to be retrieved in cyclical sequential order at the scan rate of the scanner under the control of a scan counter 42 that is incremented by the start of scan (SoS) pulses.

Conclusion

In view of the foregoing, it will be understood that the present invention inhibits the ordinary periodic duty cycle variations of arithmetically synthesized bit clocks from being a significant source of defects in images printed by digital printers under the control of such a bit clock. Digital printers typically employ flying spot scanners having multi-faceted, rotating polygons, so it will be recalled that predetermined, pseudo-random offsets which preloaded into the accumulator of an arithmetic frequency synthesizer to carry out this invention may vary from facet-to-facet of such a polygon, but be time invarient for each of its the facets. That, in turn, permits signature compensation to be provided for the respective facets of the polygon, without requiring any relaxation of the pixel positioning precision of the printer.

Typically, a word length of approximately twenty bits (R=20) gives an arithmetic frequency synthesizer sufficient frequency resolution for quality printing, but it will be evident that the present invention may be employed with frequency synthesizers operating with longer or shorter words.

What is claimed:

1. In a digital printer including
an arithmetic frequency synthesizer having an accumulator for recursively accumulating a R-bit long word of value, N, where $-2^{R-1} \leq N < 2^R$, to provide an accumuland with a most significant bit oscillating at a bit clock frequency proportional to the value N;
means coupled to said frequency synthesizer for modulating a light beam at said bit clock frequency in accordance with data samples representing an image; and
scanner means for repeatedly scanning the modulated light beam across a photosensitive recording medium to print said image on said recording medium in accordance with a raster scanning pattern;
the improvement comprising
means coupled to said frequency synthesizer for preloading pseudo-random offset values into said accumulator for successive scans, said offset values pseudo-randomly varying from scan-to-scan within a range $0 \leq accm_i < N$, where $accm_i$ is the offset value for any given scan, whereby said bit clock is pseudo-randomly phase shifted from scan-to-scan without significantly affecting its frequency.

2. The improvement of Claim 1 wherein
said scanner means a multi-faceted reflective polygon optically aligned so that one after another of its facets scan the modulated light beam across said recording medium as said polygon rotates, and
the value N of the word accumulated by said accumulator varies as a function of time for adjusting said bit clock frequency.

3. The improvement of Claim 2 wherein
each of the facets of said polygon has a known signature error, and
said printer further includes means for adjusting the value N of said word prior to each scan to include a correction value selected to substantially compensate for the signature error of the facet by which the scan is to be performed.

4. The improvement of Claim 3 wherein
a predetermined pseudo-random offset value, including a signature correction value, is preloaded into said accumulator for each scan by each facet of said polygon, whereby signature compensation is provided for said polygon without significantly affecting the phase or frequency of said bit clock.

* * * * *